(12) United States Patent
Macchia (10) Patent No.: US 8,097,972 B2
(45) Date of Patent: Jan. 17, 2012

(54) GAS TURBINE WITH MAGNETIC SHAFT FORMING PART OF A GENERATOR/MOTOR ASSEMBLY

(75) Inventor: Enzo Macchia, Kleinburg (CA)

(73) Assignee: Pratt & Whitney Canada Corp., Longueuil (CA)

( * ) Notice: Subject to any disclaimer, the term of this patent is extended or adjusted under 35 U.S.C. 154(b) by 456 days.

(21) Appl. No.: 12/493,705

(22) Filed: Jun. 29, 2009

(65) Prior Publication Data
US 2010/0327588 A1 Dec. 30, 2010

(51) Int. Cl.
*F01D 15/10* (2006.01)
*F02C 6/00* (2006.01)
*H02K 7/18* (2006.01)
*H02P 9/04* (2006.01)
*F03H 1/00* (2006.01)
*F02K 3/02* (2006.01)
*F02C 9/00* (2006.01)

(52) U.S. Cl. ........... 290/52; 60/203.1; 60/226.1; 60/773
(58) Field of Classification Search ............... 290/52; 60/203.1, 226.1, 773
See application file for complete search history.

(56) References Cited

U.S. PATENT DOCUMENTS

| | | | |
|---|---|---|---|
| 3,558,941 A * | 1/1971 | Visconti Brebbia et al. | 310/49.15 |
| 3,842,300 A * | 10/1974 | Daykin et al. | 310/216.004 |
| 4,806,841 A * | 2/1989 | Lee et al. | 322/29 |
| 4,827,712 A | 5/1989 | Coplin | 60/226.1 |
| 5,861,694 A * | 1/1999 | Niemela | 310/89 |
| 5,867,979 A | 2/1999 | Newton et al. | 60/226.1 |
| 6,028,378 A * | 2/2000 | Lack et al. | 310/51 |
| 6,357,220 B1 | 3/2002 | Snyder et al. | 60/796 |
| 6,459,180 B1 | 10/2002 | Mori et al. | 310/61 |
| 6,469,725 B1 | 10/2002 | Nagahata | 347/209 |
| 6,522,041 B1 * | 2/2003 | Verbrugge et al. | 310/154.01 |
| 6,657,337 B1 * | 12/2003 | Delevallee | 310/89 |
| 6,692,222 B2 | 2/2004 | Prinz et al. | 415/14 |
| 6,700,269 B2 * | 3/2004 | Torii et al. | 310/154.08 |
| 6,703,753 B1 * | 3/2004 | Fujinaka | 310/216.071 |
| 6,710,493 B2 * | 3/2004 | Yoshikawa et al. | 310/154.08 |
| 6,774,515 B2 | 8/2004 | Mori et al. | 310/61 |
| 6,806,607 B2 * | 10/2004 | Lau | 310/154.01 |
| 6,838,799 B1 * | 1/2005 | Caiozza | 310/190 |
| 6,867,523 B2 * | 3/2005 | Higuchi | 310/154.15 |
| 6,891,296 B1 * | 5/2005 | Huang et al. | 310/156.01 |
| 6,895,741 B2 | 5/2005 | Rago et al. | 60/226.1 |
| 6,914,344 B2 | 7/2005 | Franchet et al. | 290/52 |
| 6,965,183 B2 | 11/2005 | Dooley | 310/201 |
| 7,059,136 B2 | 6/2006 | Coffinberry | 60/785 |

(Continued)

FOREIGN PATENT DOCUMENTS
GB 1147730 4/1969

(Continued)

*Primary Examiner* — Pedro J Cuevas
(74) *Attorney, Agent, or Firm* — Norton Rose OR LLP (57) ABSTRACT

A gas turbine engine including a first shaft being one of a main shaft concentrically mounted to at least one turbine rotor and a tower shaft directly driven by the main shaft and extending generally radially therefrom, the first shaft having a reduced diameter portion located within the gas turbine engine, an electrical assembly having a rotor comprising permanent magnets retained on an outer surface of the reduced diameter portion and a stator comprising a magnetic field circuit disposed adjacent an outer periphery of the rotor, and an electrical connection between the magnetic field circuit and at least one of a power source and an electrically drivable accessory.

15 Claims, 7 Drawing Sheets

U.S. PATENT DOCUMENTS

| | | |
|---|---|---|
| 7,107,756 B2 | 9/2006 | Rolt .................................. 60/224 |
| 7,159,295 B2 * | 1/2007 | Lau ................................... 29/596 |
| 7,208,854 B1 * | 4/2007 | Saban et al. ....................... 310/61 |
| 7,224,082 B2 | 5/2007 | Bouiller et al. ................... 290/52 |
| 7,368,843 B2 * | 5/2008 | Yokota et al. ........... 310/216.067 |
| 7,375,447 B2 * | 5/2008 | Oomori et al. ................... 310/88 |
| 7,498,706 B2 * | 3/2009 | Kuroda .................... 310/154.01 |
| 7,514,806 B2 * | 4/2009 | Xu et al. .......................... 290/31 |
| 7,579,745 B2 * | 8/2009 | Yamada et al. ............... 310/269 |
| 7,638,914 B2 * | 12/2009 | Miekka .................... 310/154.01 |
| 7,732,962 B2 * | 6/2010 | Kuroda .................... 310/154.01 |
| 7,732,963 B2 * | 6/2010 | Iizuka et al. ............. 310/154.21 |
| 2002/0047381 A1 * | 4/2002 | Torii et al. ........................ 310/89 |
| 2002/0096957 A1 * | 7/2002 | Wei ................................. 310/180 |
| 2002/0104316 A1 | 8/2002 | Dickey et al. ................... 60/772 |
| 2005/0193738 A1 | 9/2005 | Hayasaka et al. ............... 60/726 |
| 2007/0101696 A1 * | 5/2007 | Dooley ........................ 60/203.1 |
| 2007/0245709 A1 | 10/2007 | Dooley ........................ 60/226.1 |
| 2007/0246302 A1 | 10/2007 | Bell et al. ....................... 84/6.11 |
| 2007/0289310 A1 | 12/2007 | Dooley et al. ................... 60/773 |
| 2008/0001492 A1 * | 1/2008 | Cros et al. ....................... 310/233 |
| 2008/0024026 A1 * | 1/2008 | Aoyama et al. .......... 310/154.01 |
| 2008/0072567 A1 * | 3/2008 | Moniz et al. ................. 60/226.1 |
| 2008/0075590 A1 * | 3/2008 | Moniz et al. ................... 415/229 |
| 2008/0150287 A1 | 6/2008 | Kern et al. ....................... 290/52 |
| 2008/0197740 A1 * | 8/2008 | Hughes ........................ 310/184 |
| 2008/0278014 A1 * | 11/2008 | Chen ............................. 310/114 |
| 2008/0303280 A1 * | 12/2008 | Xu et al. .......................... 290/31 |
| 2009/0045687 A1 * | 2/2009 | Yu et al. ................... 310/154.01 |
| 2010/0013361 A1 * | 1/2010 | Zhao et al. ............. 310/40 MM |
| 2010/0327588 A1 * | 12/2010 | Macchia ......................... 290/52 |
| 2011/0116955 A1 * | 5/2011 | Naito et al. ................. 417/423.7 |

FOREIGN PATENT DOCUMENTS

| | | |
|---|---|---|
| JP | 06153476 | 5/1994 |
| RU | 2244159 | 1/2005 |
| WO | 2005111381 | 11/2005 |

* cited by examiner

GAS TURBINE WITH MAGNETIC SHAFT FORMING PART OF A GENERATOR/MOTOR ASSEMBLY

TECHNICAL FIELD

The application relates generally to gas turbine engines, more particularly to electrical generator and motor assemblies for such gas turbine engines.

BACKGROUND

In gas turbine engines, it is generally known to connect a generator to a rotating shaft through an accessory gear box, in order to generate electricity used for powering accessory electrical components of the engine and/or the aircraft. The accessory gear box in turn is used to drive accessories of the gas turbine engine. The presence of the accessory gear box usually increases the overall complexity, weight and cost of the engine.

Accordingly, there is a need to provide an improved electrical generator and/or motor for a gas turbine engine.

SUMMARY

In one aspect, there is provided a gas turbine engine having a compressor section and a turbine section, comprising: a first shaft being one of a main shaft concentrically mounted to at least one turbine rotor of the turbine section and a tower shaft directly driven by the main shaft and extending generally radially therefrom, the first shaft having a portion located within the gas turbine engine, said portion of said first shaft having a reduced diameter relative to a remainder of said first shaft, the portion having said reduced diameter forming at least one circumferentially-extending recess in the first shaft; an electrical machine assembly having a rotor and a stator, the rotor including permanent magnets secured to an outer surface of the reduced diameter portion of the first shaft such that the permanent magnets of said rotor are received within said circumferential recess, the stator being disposed adjacent an outer periphery of the rotor and including at least one field winding, the rotor and the stator cooperating in use to provide a magnetic circuit for conducting magnetic flux around the at least one field winding; and an electrical connection between the at least one winding and at least one of a power source and a power distribution system.

In another aspect, there is provided a gas turbine engine comprising at least one turbine rotor and a first shaft being one of a main shaft concentrically mounted to the at least one turbine rotor and a tower shaft directly driven by the main shaft and extending generally radially therefrom, the first shaft having a reduced diameter portion located within the gas turbine engine and having a smaller outer diameter than that of adjacent portions of the first shaft, an electrical assembly having a rotor comprising permanent magnets retained on an outer surface of the reduced diameter portion and a stator comprising a magnetic field circuit disposed adjacent an outer periphery of the rotor, and an electrical connection between the magnetic field circuit and at least one of a power source and an electrically drivable accessory.

DESCRIPTION OF THE DRAWINGS

Reference is now made to the accompanying figures, in which.

DETAILED DESCRIPTION

Figure 1:
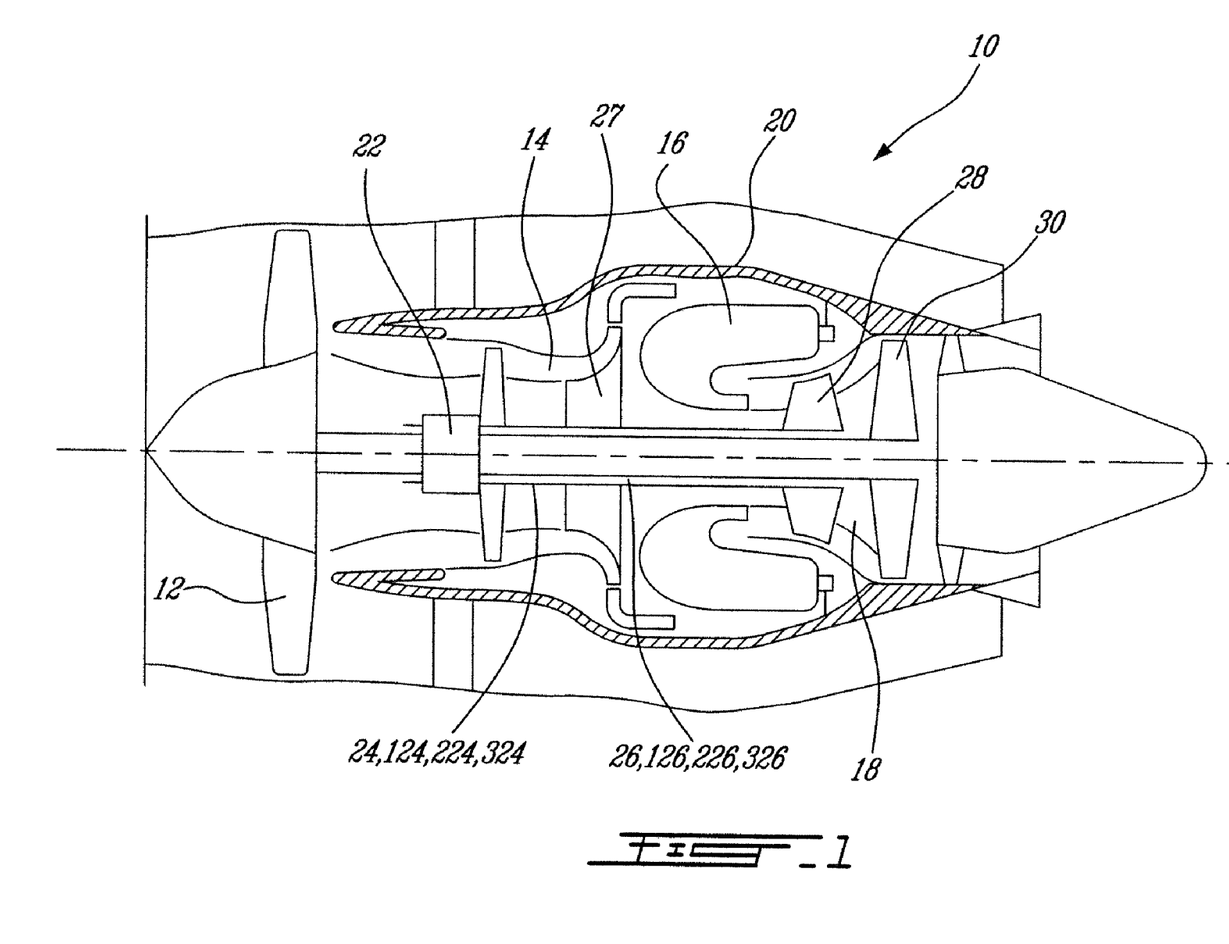
FIG. 1 is a schematic side cross-sectional view of a gas turbine engine including a generator/motor electrical assembly mounted to a high pressure shaft thereof.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

The engine 10 comprises a high pressure shaft 24 and a low pressure shaft 26 which are rotationally attached to the engine casing 20 via bearings. The high pressure shaft 24 is tubular so that the low pressure shaft 26 extends therethrough. The high pressure shaft 24 drivingly interconnects at least one high pressure rotor 28 of the turbine section 18 and at least one high pressure rotor 27 of the compressor 14, while the low pressure shaft 26 drivingly interconnects at least one low pressure rotor 30 of the turbine section 18 and at least one low pressure rotor of the compressor section, which includes the compressor 14 and the fan 12. As such, in the embodiment shown, the at least one low pressure rotor of the compressor section includes the fan 12. The high pressure shaft 24 and the low pressure shaft 26 are rotationally independent from one another.

Figure 2:
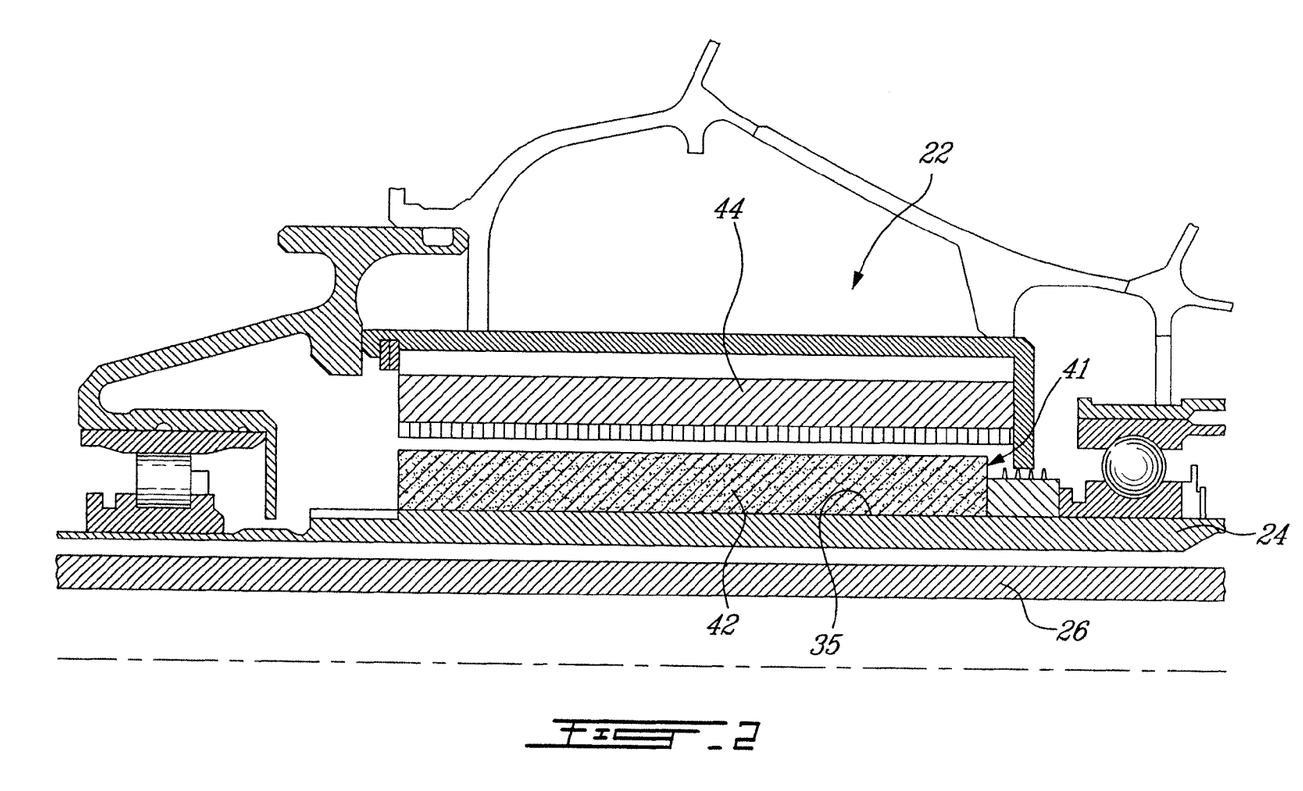
FIG. 2 is a schematic side cross-sectional view of the generator/motor electrical assembly of FIG. 1.

Referring to FIG. 2, a generator/motor electrical assembly 22 is mounted to a main shaft of the engine, which in the embodiment shown is the high pressure shaft 24. The electrical assembly 22 comprises a rotor 41 and a stator 44. The rotor 41 comprises at least two permanent magnets 42 fixedly secured on the outer surface 35 of the high pressure shaft 24, for example by being press fitted. The stator 44 comprises a magnetic field circuit fixedly secured to the engine casing and circumferentially disposed about the outer periphery of the rotor 41 so that the magnetic fields generated by the magnetic field circuit interact with those of the permanent magnets 42. The magnets 42 are retained on the outer surface 35 of the shaft 24 using any adequate type of connection, for example a suitable type of adhesive.

Figure 3A:
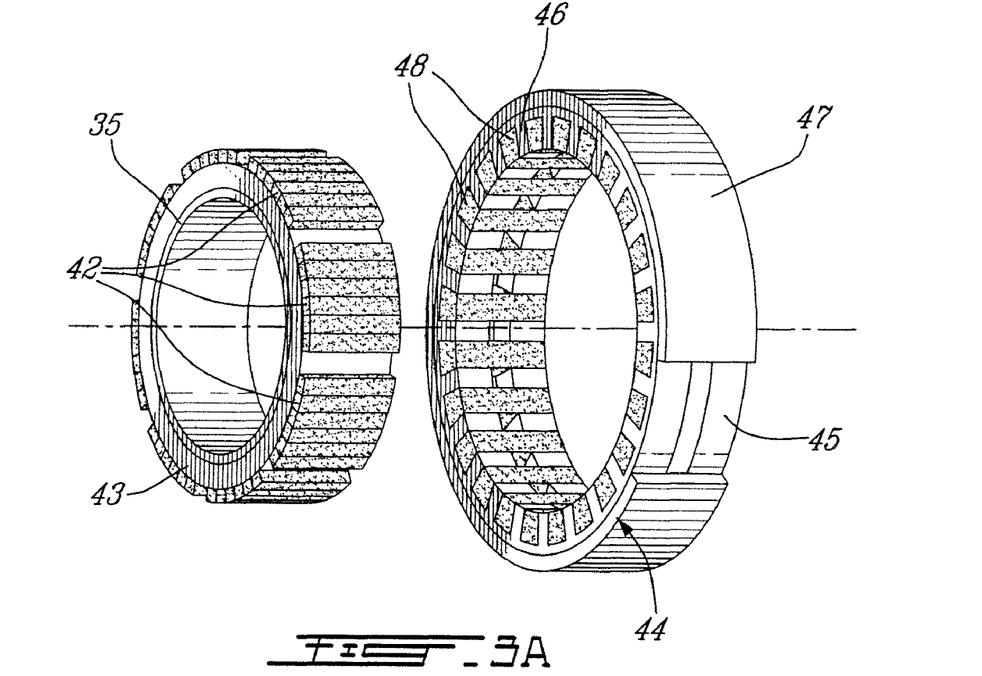
FIG. 3A is a schematic perspective view of the stator and part of the rotor of the electrical assembly of FIG. 2.

Referring to FIG. 3A, an annular laminated core 43 is optionally secured to the outer surface 35 of the high pressure shaft 36, to which the permanent magnets 42 are attached. The high pressure shaft 36 forms an annular solid core of the electrical assembly rotor 41.

Figure 3B:
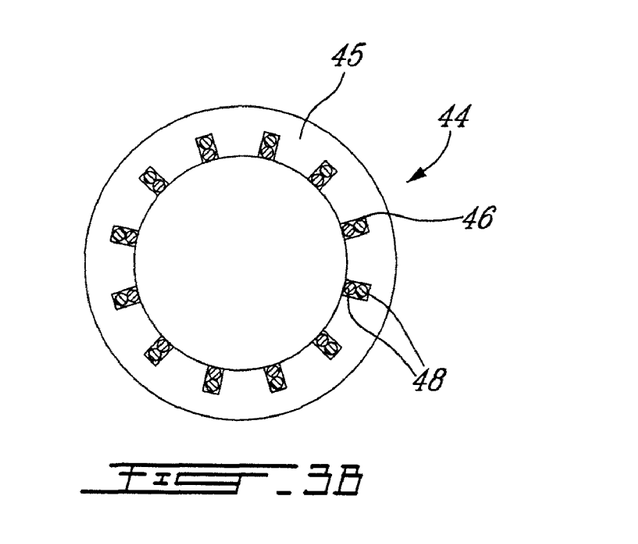
FIG. 3B is a schematic front cross-sectional view of a stator of the electrical assembly of FIG. 2.

FIGS. 3A-3B illustrate one embodiment of the stator 44 of the electrical assembly 22 illustrated in FIG. 2. The stator 44 comprises a tubular laminated core 45 positioned around the permanent magnets 42 with an air gap being defined therebetween. The tubular laminated core 45 is provided with twelve slots 46 longitudinally extending on its inner surface, and surrounded on its outer surface by a tubular solid core 47. Conductive wires 48 are embedded in each slot 46. The conductive wires 48 are connected together to form any adequate type of magnetic field circuit. Materials suitable for the conductive wires 48 include, but are not limited to, copper wire and nano carbon tubes. In a particular embodiment, the conductive wires 48 are connected to form a 3-phase winding system in a way that the angle between the stator magnetic flux and the rotor magnetic flux is kept substantially at 90°. In this case, the electrical assembly 22 forms a permanent magnet synchronous generator/motor (PMSM).

While FIGS. 3A-3B illustrates an embodiment of a stator comprising twelve slots 46, it should be understood that the number of slots 46 and wires 48 may vary. Similarly, it should be understood that other types of electrical connections between the conductive wires 48 are also possible as long as the stator 44 comprises at least two poles.

While FIGS. 3A-3B illustrates a magnetic field circuit achieved by embedding wires 48 into the tubular ring 45, it should be understood that the stator 44 can comprise any adequate type of electromagnet of which the pole can be changed. For example, an electromagnet can consist in a coil of copper wires. The electromagnet can have any shape which ensures that its magnetic field interact with that of the permanent magnets embedded in the high pressure shaft.

In one embodiment, the electrical assembly 22 is used as an electricity generator. The rotation of the turbine rotor 28 drives the high pressure shaft 24. As a result, the permanent magnets 42 of the rotor 41 are rotated in the stator 44 and an electrical current is induced in the magnetic field circuit of the stator 44. The external circuit comprises the accessory equipments powered by the electrical assembly 22.

In the same or an alternate embodiment, the electrical assembly 22 is used as a motor to act as a starter for starting the rotation of the turbine rotor 28. In this case, the magnetic field circuit of the stator 44 is powered by a source of electrical current, and the produced rotating force or torque drives the high pressure shaft 24 which induces the rotation of the turbine rotor 28. Once the gas turbine is started, the turbine drives the rotor 41 as mentioned above.

Figure 4:
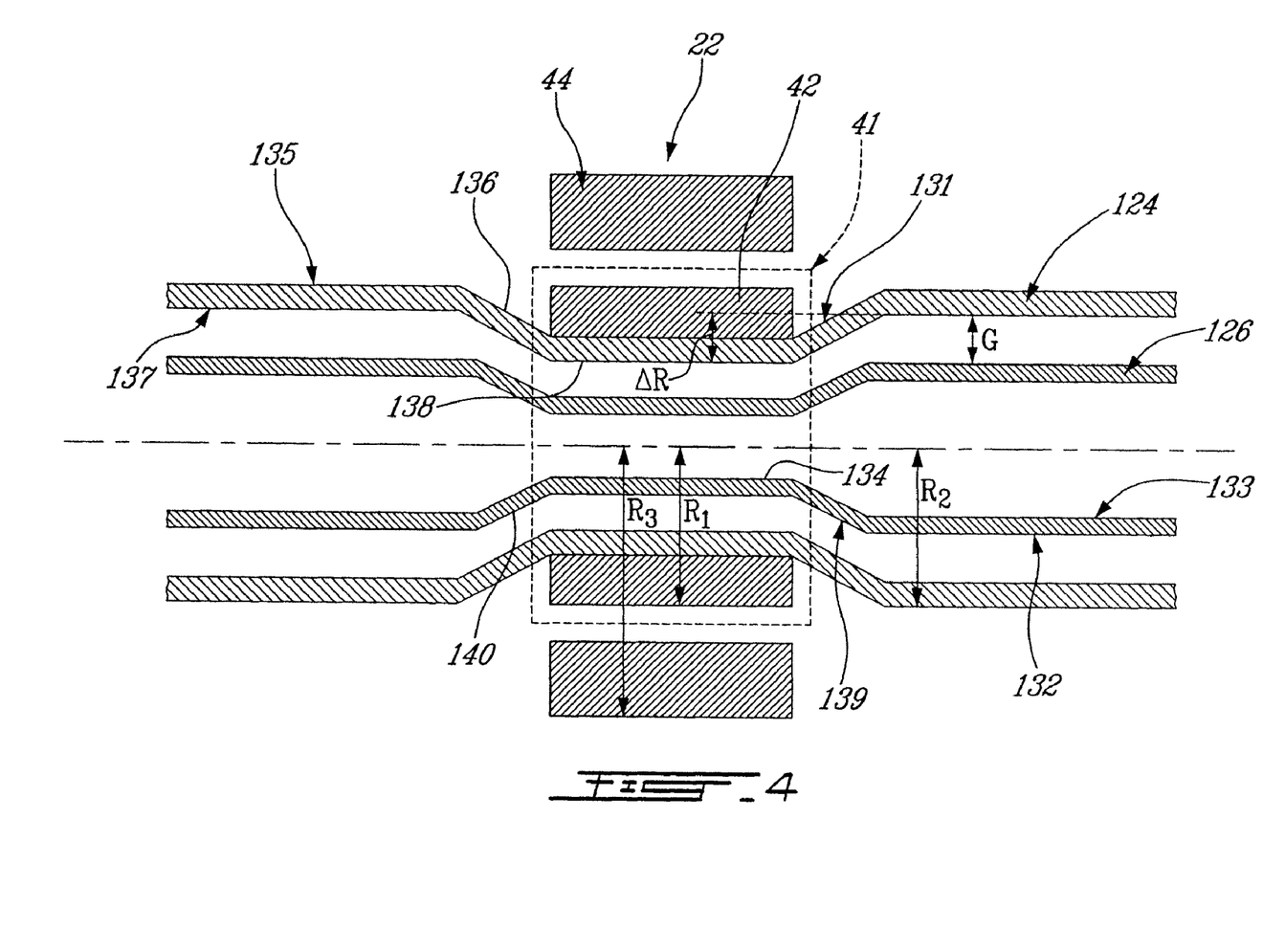
FIG. 4 is a schematic side cross-sectional view of the generator/motor electrical assembly where the permanent magnets are mounted in a recess, in accordance with an alternate embodiment.

FIG. 4 illustrates an embodiment where the high pressure shaft 124 includes a reduced diameter portion 131 located in the core of the compressor section, near the end of the shaft 124 opposite of the turbine rotor 28 but spaced apart therefrom. The reduced diameter portion 131 forms a circumferential recess 136 in its outer surface 135, where the permanent magnets 42 are received. An annular laminated core (not shown) similar to that shown in FIG. 3A can optionally be secured to the outer surface 135 of the reduced diameter portion 131, i.e. within the recess 136, and the permanent magnets 42 are received thereon.

The reduced diameter portion also forms a circumferential protrusion 138 on its inner surface 137 in alignment with the recess 136. In the embodiment shown, the recess 136 and the protrusion 138 have substantially the same shape and they are sized such that the thickness of the wall of the high pressure shaft remains at least substantially constant near and throughout the recess 136.

The low pressure shaft 126 is also provided with a reduced diameter portion 139, forming a circumferential recess 140 in its outer surface 132. The shape, size and location of the recess 140 is selected such as to have an adequate gap between the low pressure shaft 126 and the protrusion 138 of the high pressure shaft 124. In the embodiment shown, the thickness of the wall of the low pressure shaft 126 remains at least substantially constant near and throughout the recess 140, through a corresponding protrusion 134 formed in its inner surface 133.

While FIG. 4 illustrates a recess 136 and a protrusion 138 of the high pressure shaft 124 having substantially the same shape and size, it should be understood that they can be provided with different shapes and sizes as along as the protrusion 138 is larger than the recess 136 so that the protrusion 138 can receive the recess 136. Similarly, the recess 140 on the low pressure shaft 126 can have any shape and size as long it prevents the protrusion 138 to be in physical contact with the outer surface 132 of the low pressure shaft 126.

In one embodiment, the reduction in inner radius $\Delta R$ of the high pressure shaft 124 due to the presence of the reduced diameter portion 131 is superior or substantially equal to the radial gap G between the two shafts 124, 126 outside of the reduced diameter portions 131, 139, and as such the recess 140 in the low pressure shaft 126 prevents the protrusion 138 of the high pressure shaft 124 from contacting the low pressure shaft 126.

In another embodiment, the reduction in inner radius $\Delta R$ of the high pressure shaft 124 is inferior to the radial gap G. In this case, the recess 140 in the low pressure shaft 126 allows to maintain the gap G, or a gap of an adequate size different from the gap G, between the between the two shafts 124, 126, such as to prevent any contact that could occur between the protrusion 138 of the high pressure shaft 124 and the outer surface 132 of the low pressure shaft 126 due to vibrations, for example.

In the embodiment shown, the thickness of the permanent magnets 42 is superior to that of the wall of the high pressure shaft 124. As such, the presence of the protrusion 138 allows for the recess 136 to be deep enough to accommodate the permanent magnets 42 therein, such that the outer radius $R_1$ defined by the outer surface of each magnet 42 is inferior or substantially equal to the outer radius $R_2$ of the non-recessed region of the high pressure shaft 24.

The protrusion 138 is also sized such that the thickness of the wall of the high pressure shaft remains at least substantially constant near and throughout the recess 136, as mentioned above.

While FIG. 4 illustrates one embodiment of an electrical assembly 22 in which the outer surface of the permanent magnet 42 is substantially aligned with the outer surface of the non-recessed portion of the high pressure shaft 124 (i.e. $R_1$ substantially equal to $R_2$), it should be understood that $R_1$ may be inferior or superior to $R_2$. The recesses 136 and 140, and the protrusion 138 are used to minimize the external diameter of the electrical assembly 22, i.e. to minimize the radius $R_3$ of the magnetic field circuit of the stator 44.

Figure 5:
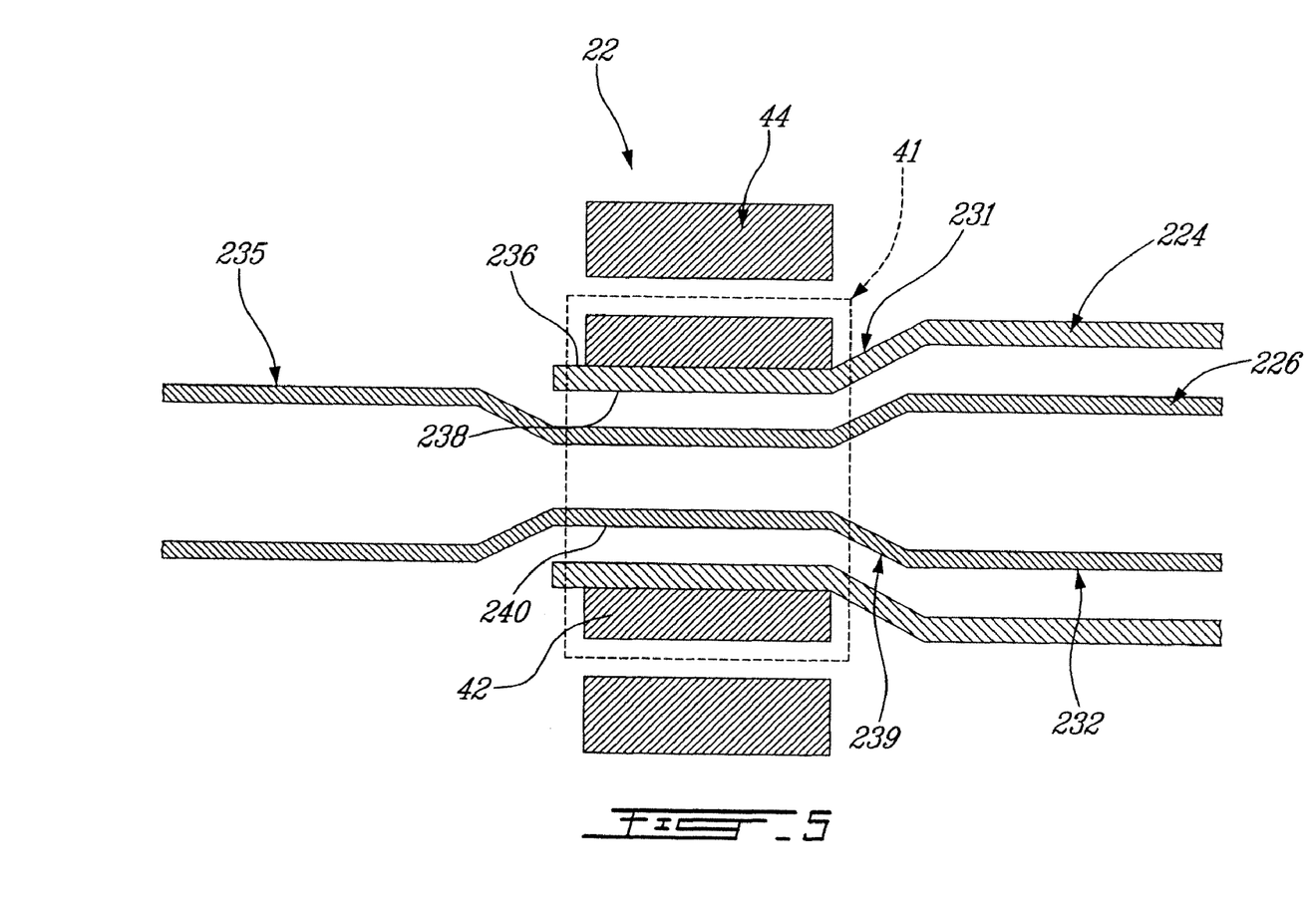
FIG. 5 is a schematic side cross-sectional view of a generator/motor assembly mounted to an end of a high pressure shaft, in accordance with an alternate embodiment.

It should be understood that the electrical assembly 22 may be located anywhere along the length of the high pressure shaft 24. For example, FIG. 5 illustrates an alternate embodiment in which the electrical assembly 22 is positioned in the core of the compressor section forward of the high pressure compressor near the end the high pressure shaft 224. The high pressure shaft 224 includes a reduced diameter portion 231 at its end, forming a circumferential recess 236 on its outer surface 235 and a circumferential protrusion 238 on its inner surface 237 in alignment with the recess 236. In the embodiment shown, the recess 236 and the protrusion 238 have substantially the same shape and they are sized so that the recess 236 substantially fits into the protrusion 238.

The low pressure shaft 226 is also provided with a reduced diameter portion 239, forming a circumferential recess 240 in its outer surface 232. The shape, size and location of the recess 240 is selected such as to have an adequate gap between the low pressure shaft 226 and the protrusion 238 of the high pressure shaft 224.

As in the previous embodiment, the generator/motor electrical assembly 22 is mounted to the high pressure shaft 224. The rotor 41 of the electrical assembly 22 comprises at least two permanent magnets 42 fixedly secured on the outer surface of the high pressure shaft 224 within the recess 236. The stator 44 of the electrical assembly 22 comprises a magnetic field circuit fixedly secured to the engine casing and circumferentially disposed about the outer periphery of the rotor 41 so that the magnetic fields generated by the magnetic field circuit interact with those of the permanent magnets 42.

In a particular embodiment, the recesses 136, 236 and the protrusions 138, 238, of the high pressure shaft 124, 224 are circumferential, i.e. they are defined around the entire circumference of the shaft 124, 224. In an alternate embodiment, the high pressure shaft 124, 224 is provided with at least two discrete recesses and at least two discrete protrusions which extend only around part of a same circumference of the shaft.

Figure 6:
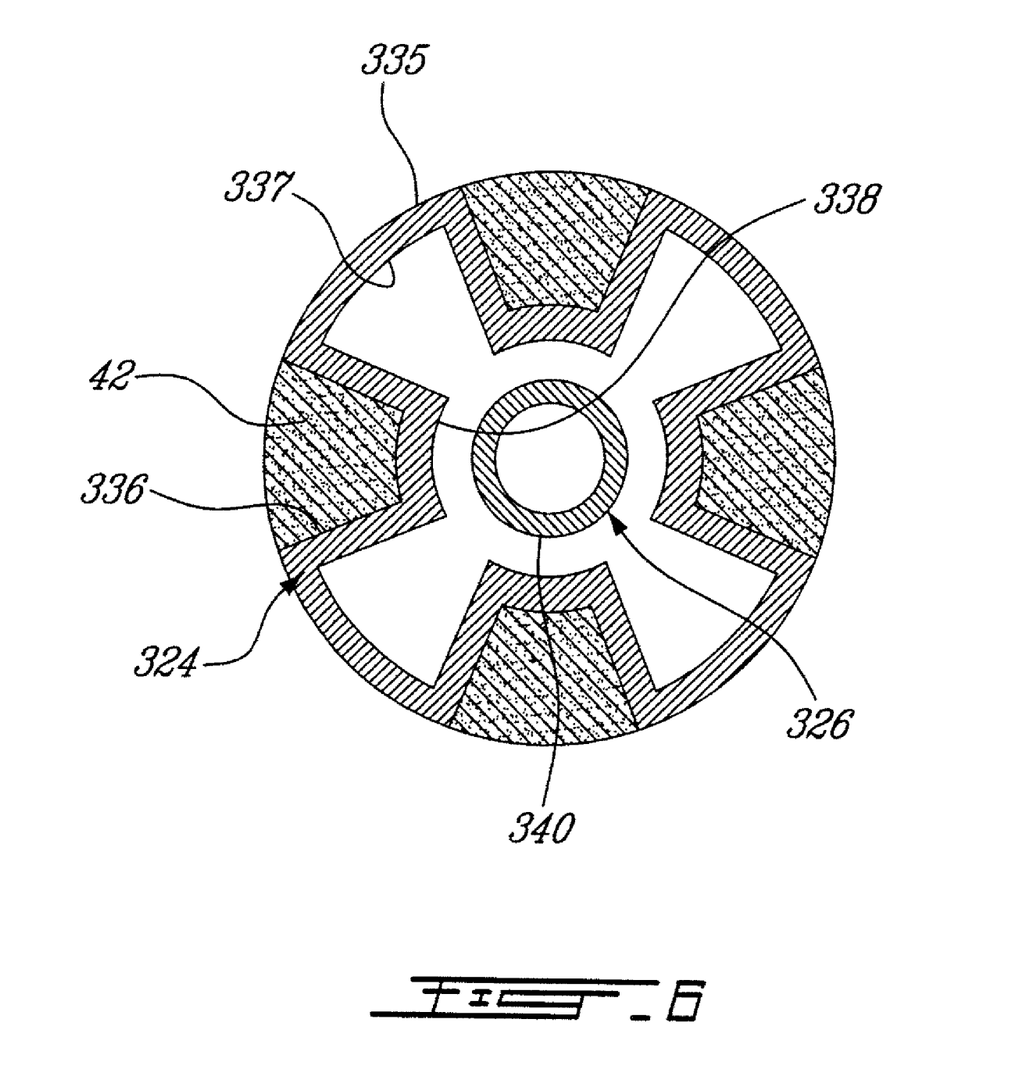
FIG. 6 is a schematic front cross-sectional view of a rotor of a generator/motor assembly comprising four permanent magnets embedded in a high pressure shaft, in accordance with an alternate embodiment.

FIG. 6 illustrates one such embodiment where the high pressure shaft 324 comprises four separate recesses 336 formed on its outer surface 335, each of which extending around part of a same circumference thereof. A permanent magnet 42 is embedded in each recess 336. A corresponding protrusion 338 is formed in the inner surface 337 of the shaft 324 in alignment with each recess 336, such that each recess 336 can be deep enough to receive a magnet 42 having a thickness larger than the wall of the shaft 324 without protruding therefrom (i.e. such that the outer radius of the portion of the shaft receiving the magnets 42 remains inferior or substantially equal to the outer radius of the non-recessed portions of the shaft 324). The low pressure shaft 326 comprises a circumferential recess 340 similar to that shown in FIGS. 4 and 5 in alignment with the protrusions 338 of the high pressure shaft 326.

While in the embodiment illustrated in FIG. 6, the rotor comprises four permanent magnets 42 embedded in the high pressure shaft, it should be understood that any adequate number of permanent magnets superior or equal to two can be used.

Figure 7:
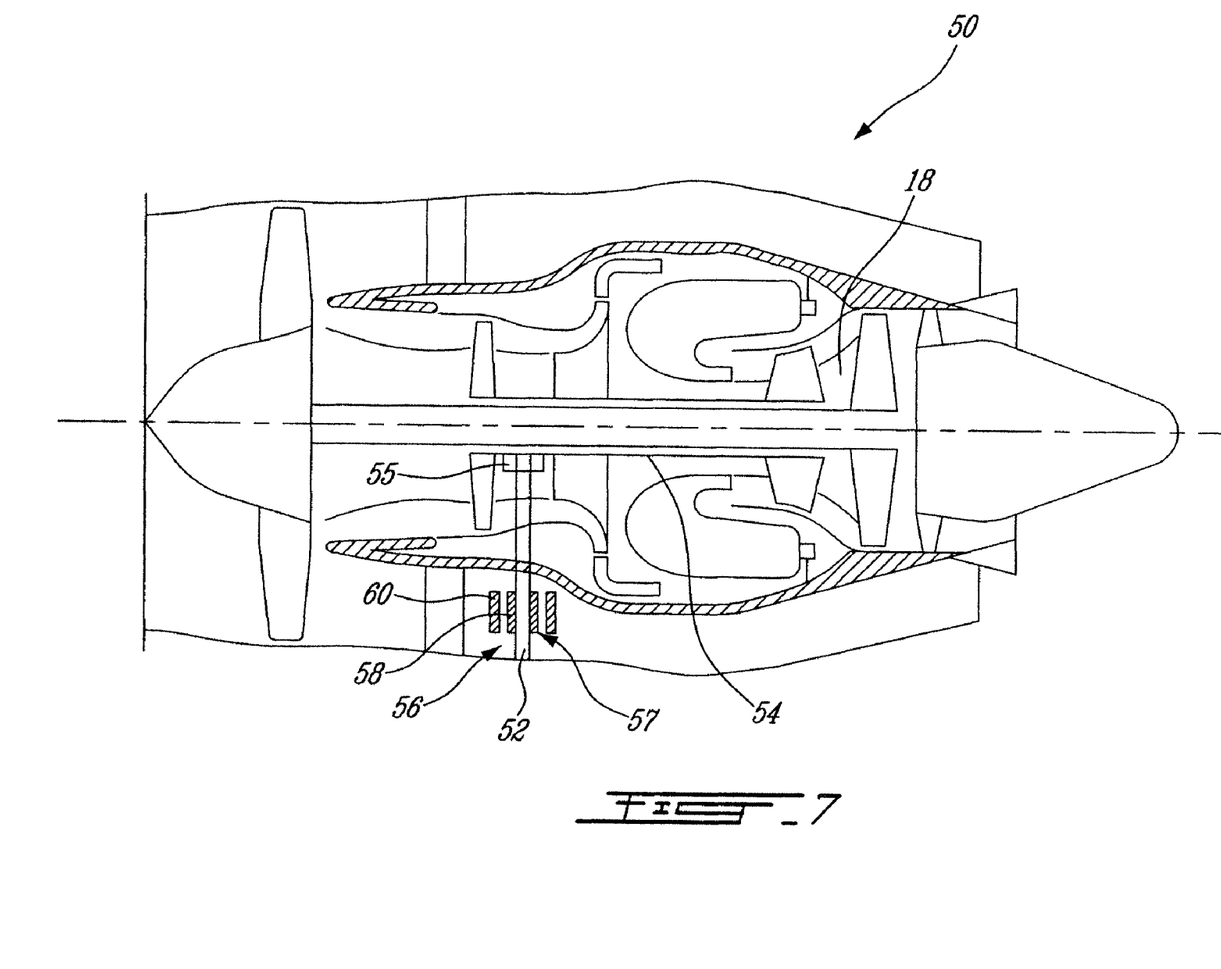
FIG. 7 is a schematic cross-sectional view of a gas turbine engine provided with a generator/motor mounted on a tower shaft thereof.

In another example illustrated in FIG. 7, the generator/motor electrical assembly is associated with an accessory or tower shaft. In this embodiment, a gas turbine engine 50 comprises a tower shaft 52 which is drivingly connected to a main shaft, for example the high pressure shaft 54, via a gear interface 55. The tower shaft 52 is directly driven by the main shaft and extends non-coaxially therewith. Although the tower shaft 52 is shown here as extending perpendicularly to the high pressure shaft 54, other orientations are alternately possible. The high pressure shaft 54 is drivingly connected to at least one turbine rotor of the turbine section 18.

The generator/motor electrical assembly 56 is associated with the tower shaft 52 in order to generate electricity and/or start the turbine rotor. The electrical assembly 56 comprises a rotor 57 formed by at least two permanent magnets 58 secured to the circumferential outer surface of the tower shaft 52. A stator 60 is positioned in the outer periphery of the permanent magnets 58 so that their electromagnetic fields interact together.

The electrical assembly 56 is located in a main strut of the gas turbine engine and ventilated by bypass air for cooling purposes.

In the embodiment shown, the tower shaft 52 comprises no recess and the permanent magnets 58 are secured on the non-recesses circumferential surface of the tower shaft 52.

In an alternate embodiment, the tower shaft 52 is provided with a circumferential recess on its outer surface similarly to that of the high pressure shaft 124 in FIG. 4 or of the high pressure shaft 224 in FIG. 5, and receives the permanent magnets 58 therein.

In an alternate embodiment, the tower shaft 52 is provided with a series of recesses each extending around part of the circumference of its outer surface, similarly to that of the high pressure shaft 324 in FIG. 6.

In a particular embodiment, the stator 60 comprises a magnetic field circuit such as the one illustrated in FIGS. 3A-3B. Other embodiments for the stator 60 are also possible.

In a particular embodiment, the electrical assembly 22, 56 allows for the accessory gear box typically provided in a gas turbine engine to be omitted, and as such can allow for reducing the complexity and weight of the engine. Elimination of the accessory gear box can also improve the maintainability and increase engine life through the reduction of elements present in the engine.

Optionally, a "mini" accessory gear box can be provided, for example mounted on the tower shaft 52, to drive other accessories.

In a particular embodiment, both the electrical assembly 22 on the main shaft and the electrical assembly 56 on the tower shaft are provided in the same engine. In such a configuration, one electrical assembly can act as a back up for the other, and/or one can be used as a generator while the other is used as a motor.

In a particular embodiment, the electrical assembly 22 on the main shaft and/or the electrical assembly 56 on the tower shaft are added to an existing engine, as a retrofit.

The above description is meant to be exemplary only, and one skilled in the art will recognize that changes may be made to the embodiments described without departing from the scope of the invention disclosed. For example, the electrical assembly can be provided on other types of gas turbine engines such as turboprop engines, turboshaft helicopter engines, as well as on industrial and marine gas turbine engines, and gas turbine engines of various sizes. Still other modifications which fall within the scope of the present invention will be apparent to those skilled in the art, in light of a review of this disclosure, and such modifications are intended to fall within the appended claims.

The invention claimed is:

1. A gas turbine engine having a compressor section and a turbine section, comprising:

a first shaft being one of a main shaft concentrically mounted to at least one turbine rotor of the turbine section and a tower shaft directly driven by the main shaft and extending generally radially therefrom, the first shaft having a portion located within the gas turbine engine, said portion of said first shaft having a reduced diameter relative to a remainder of said first shaft, the portion having said reduced diameter forming at least one circumferentially-extending recess in the first shaft;

an electrical machine assembly having a rotor and a stator, the rotor including permanent magnets secured to an outer surface of the reduced diameter portion of the first shaft such that the permanent magnets of said rotor are received within said circumferential recess, the stator being disposed adjacent an outer periphery of the rotor and including at least one field winding, the rotor and the stator cooperating in use to provide a magnetic circuit for conducting magnetic flux around the at least one field winding; and an electrical connection between the at least one winding and at least one of a power source and a power distribution system.

2. The gas turbine engine as claimed in claim 1, wherein the permanent magnets of said rotor are secured to said outer surface of the reduced diameter portion of the first shaft in a press fit engagement.

3. The gas turbine engine as claimed in claim 1, wherein an inner diameter of the permanent magnets of said rotor is less than a nominal outer diameter of the first shaft outside said portion having the reduced diameter.

4. The gas turbine engine as claimed in claim 1, wherein the permanent magnets of said rotor are at least partially embedded within said circumferentially-extending recess.

5. The gas turbine engine as claimed in claim 1, wherein the first shaft is the main shaft, the main shaft being hollow and having an inner surface provided with at least one protrusion axially aligned with the circumferentially-extending recess, the engine further comprising a second shaft concentrically mounted to at least a second turbine rotor of the turbine section, the second shaft extending within the first shaft concentrically therewith and rotating independently therefrom, the second shaft having a second outer surface and at least one second circumferentially-extending recess therein which has a reduced diameter relative to a remainder of the second shaft, the second recess in the second shaft being axially aligned with the circumferentially-extending recess in the first shaft.

6. The gas turbine engine as claimed in claim 1, wherein the first shaft is the main shaft, and wherein the circumferentially-extending recess therein is defined at an end of the main shaft opposite of the at least one turbine rotor.

7. The gas turbine engine as claimed in claim 1, wherein the first shaft is the main shaft, and wherein said portion of the main shaft having the circumferentially-extending recess is located substantially within the compressor section of the gas turbine engine.

8. The gas turbine engine as claimed in claim 1, wherein the circumferentially-extending recess extends non-continuously about an outer circumference of the first shaft and comprises at least two separate recesses each extending around a respective portion of the outer circumference.

9. The gas turbine engine as claimed in claim 1, wherein the circumferentially-extending recess is sized relative to the permanent magnets such that an outer radius of the shaft and permanent magnets defined by an outer surface of each permanent magnet is inferior or substantially equal to an outer radius of the portion of the shaft at a location adjacent the circumferentially-extending recess.

10. A gas turbine engine comprising at least one turbine rotor and a first shaft being one of a main shaft concentrically mounted to the at least one turbine rotor and a tower shaft directly driven by the main shaft and extending generally radially therefrom, the first shaft having a reduced diameter portion located within the gas turbine engine and having a smaller outer diameter than that of adjacent portions of the first shaft, an electrical assembly having a rotor comprising permanent magnets retained on an outer surface of the reduced diameter portion and a stator comprising a magnetic field circuit disposed adjacent an outer periphery of the rotor, and an electrical connection between the magnetic field circuit and at least one of a power source and an electrically drivable accessory.

11. The gas turbine engine as claimed in claim 10, wherein the first shaft is hollow, the engine further comprising a second shaft extending within the first shaft concentrically therewith and rotating independently therefrom, the second shaft having a reduced diameter portion having a smaller outer diameter than that of adjacent portions of the second shaft, the reduced diameter portion of the second shaft being aligned with the reduced diameter portion of the first shaft.

12. The gas turbine engine as claimed in claim 10, wherein the first shaft is the main shaft, and the reduced diameter portion is defined at an end of the main shaft opposite of the at least one turbine rotor.

13. The gas turbine engine as claimed in claim 10, wherein the reduced diameter portion is located within a compressor section of the gas turbine engine.

14. The gas turbine engine as claimed in claim 10, wherein the reduced diameter portion is sized relative to the permanent magnets such as to prevent the permanent magnets from radially protruding beyond an outer surface of the adjacent portions of the first shaft.

15. The gas turbine engine as claimed in claim 10, wherein the first shaft is the tower shaft, and the reduced diameter portion is located in proximity of and spaced apart from an end of the tower shaft opposite of the main shaft.

\* \* \* \* \*